(12) United States Patent
Lipovski

(10) Patent No.: US 8,014,795 B2
(45) Date of Patent: Sep. 6, 2011

(54) GPSS-BASED SYSTEM AND METHOD FOR ENABLING OR DISABLING CELLPHONES IN PREDEFINED ZONES

(75) Inventor: Gerald John (Jack) Lipovski, Austin, TX (US)

(73) Assignee: CourteousCellphones LLC (Texas), Austin, TX (US)

( * ) Notice: Subject to any disclaimer, the term of this patent is extended or adjusted under 35 U.S.C. 154(b) by 0 days.

(21) Appl. No.: 12/943,121

(22) Filed: Nov. 10, 2010

(65) Prior Publication Data

US 2011/0053612 A1    Mar. 3, 2011

Related U.S. Application Data

(63) Continuation-in-part of application No. 12/785,449, filed on May 22, 2010, now Pat. No. 7,856,203, which is a continuation-in-part of application No. 11/865,810, filed on Oct. 2, 2007, which is a continuation-in-part of application No. 11/511,723, filed on Aug. 29, 2006, now Pat. No. 7,363,042, which is a continuation of application No. 10/687,024, filed on Oct. 16, 2003, now Pat. No. 7,142,877, which is a continuation of application No. 09/384,723, filed on Aug. 27, 1999, now Pat. No. 6,675,002.

(60) Provisional application No. 60/936,605, filed on Jun. 21, 2007.

(51) Int. Cl.
*H04W 24/00*    (2009.01)

(52) U.S. Cl. .................................. 455/456.4; 455/403
(58) Field of Classification Search .................. 455/403, 455/404.2, 456.1, 456.3, 456.4, 457, 3.02; 340/426.9, 539.13; 342/357.22, 357.24, 342/357.39, 357.73
See application file for complete search history.

(56) References Cited

U.S. PATENT DOCUMENTS

| | | | | |
|---|---|---|---|---|
| 5,497,508 A | * | 3/1996 | George | 455/161.2 |
| 6,519,241 B1 | * | 2/2003 | Theimer | 370/338 |
| 6,647,267 B1 | * | 11/2003 | Britt et al. | 455/404.2 |

* cited by examiner

*Primary Examiner* — Cong Tran

(57) ABSTRACT

A system and method are described for initiating, enabling, disabling or restoring cellphone operations when the cellphone is in a zone, which is where cellphone operation has to be so altered. A courtesy signal transmitter transmits a courtesy signal containing zone data, which is received by the cellphone's courtesy signal receiver. A GPSS receiver, embedded in the cellphone, outputs the current cellphone location. A cellphone's processor compares this location to the zone's coordinates; if it determines that the cellphone is in the zone, the cellphone's processor initiates, enables, or disables operations in it as directed by bits in the zone's data. Spread-spectrum technology securely passes zone data from courtesy signal transmitters to courtesy signal receivers in cellphones, using GPSS data to make this coding scheme more secure. Finally, the courtesy signal transmitter GPSS location is checked to determine if the courtesy signal transmitter has been moved after it is initialized.

20 Claims, 2 Drawing Sheets

GPSS-BASED SYSTEM AND METHOD FOR ENABLING OR DISABLING CELLPHONES IN PREDEFINED ZONES

RELATED U.S. APPLICATION DATA

This application is a continuation-in-part of application of Ser. No. 12/785,449, filed May 22, 2010, now U.S. Pat. No. 7,856,203 which is a continuation-in-part of application of Ser. No. 11/865,810, filed Oct. 2, 2007, which is a continuation-in-part of application Ser. No. 11/511,723, filed Aug. 29, 2006, now U.S. Pat. No. 7,363,042, which is a continuation of application Ser. No. 10/687,024, filed Oct. 16, 2003 now U.S. Pat. No. 7,142,877, which is a continuation of application Ser. No. 09/384,723, filed Aug. 27, 1999 now U.S. Pat. No. 6,675,002. This application also claims benefit of U.S. provisional application 60/936,605, filed Jun. 21, 2007. These applications and patents are incorporated herein by reference.

BACKGROUND OF THE INVENTION

This invention, described by this application and its parent patents, is generally in the field of initiating, disabling, enabling or restoring certain operations in a cellphone in response to where the cellphone is geographically located.

In discussing the specific art in this disclosure, parent patents' prior art term "control signal" has been replaced with this disclosure's "courtesy signal" to designate communications using ultrasonic or low-power rf (radio frequency) signals, the prior art's term "area" or "restricted area" has been replaced with this disclosure's "zone" to designate a geographic region in which cellphone operations are initiated, enabled, disabled or restored. Further, the system comprising a courtesy signal transmitter and a cellphone incorporating a courtesy signal receiver is a "courteous cellphone system", and a cellphone that has the capabilities described herein is "courteous cellphone compliant".

These patents addressed the problem of disabling communication between cellphones and a cellphone tower, such as should have been done at the 9-11 catastrophe at the world trade center. During that catastrophe, at "ground zero", non-first-responders saturated the cellphone network, so the first responders' cellphones becoming useless for emergency communications. Transmissions between the non-first-responders cellphones and cellphone towers should have been completely disabled right at non-first-responder's cellphone in order to allow first responders full use of their cellphones and the cellphone network. Courteously, however, when such transmissions are about to be disabled, the cellphone might be programmed to allow the non-first-responders cellphone user one completed telephone call to tell a friend or family member that he or she is ok, limiting the call's duration to, say 15 seconds, as well as a limited number of short calls to 911.

This application's parent applications and patents further addressed the problem of initiating, enabling, disabling or restoring of various components in a cellphone. Received courtesy signal bits comprise initiating, enabling, disabling or restoring bits. An example of initiating an operation is that when such a received initiating courtesy signal bit is '1', in order to detect hidden cellphones, a cellphone responds by initiating the cellphone sending of an rf signal that can be detected by law enforcement officers. An example of enabling an operation is that when such a received enabling courtesy signal bit is '1' the cellphone ringer is enabled so that when a new call comes in, the cellphone ringer rings. An example of disabling an operation is that when such a received disabling courtesy signal bit is '1', the cellphone ringer is disabled, so that when a new call comes in, the ringer does not ring. An example of restoring an operation is that, when such a received restoring courtesy signal bit is '1', the state of enabling or disabling, just before the previous enabling or disabling of the aforementioned operation, is restored. This application's parent applications and patents considered enabling or disabling cellphone components. This application's aforementioned operations consider initiating, enabling, disabling or restoring cellphone software operations, as well as enabling or disabling cellphone components.

Parent applications addressed the problem of disabling cellphone operations, especially texting, near a vehicle's driver when the vehicle is in motion. Parent patents also addressed the problem of overriding the disabling discussed above, to service incoming emergency calls.

These patents disclosed techniques to initiate, enable, disable or restore these operations using an ultrasonic signal or a low-power radio frequency (rf) signal. This application specifically discloses a way to use such a signal to initiate, disable, enable, or restore these operations if the cellphone comprises a global positioning satellite system (GPSS) that can be used to determine if the cellphone is in a predefined zone in which some operations are initiated, enabled, disabled or restored. Ultrasonic or low-power radio courtesy signal transmitters may be positioned by doorways at entrances to or exits from a zone, or at places near the zone, this positioning near the zone to be discussed later, to initiate, disable, enable or restore cellphone components.

Using (the signal amplitude of) a low-power rf signal, to determine if a cellphone is in a zone, could have transmission characteristics similar to 2.4 GHz Wi-Fi communications between desktop or laptop computers and internet modems in the home. In such systems, a computer located anywhere in a typical house can communicate with an internet modem located anywhere in that house, and often it can reach several neighbors' internet modems or computers as well. Analogously, a courtesy signal, sent from a courtesy signal transmitter located anywhere in the house, could enable or disable cellphone operations anywhere in the house, but would occasionally enable or disable such operations in neighboring houses too.

The main problem, in using (the signal amplitude of) an rf signal to determine if a cellphone is in a zone, is that the range of adequate strength of this signal will fade out or fade in at different places at different times, depending on the weather, signal interference, or the placement of people and objects in and near the zone. If (the signal amplitude of) an rf signal alone determines if a cellphone is in a zone, analogous to Wi-Fi, the zone might extend from time to time to neighboring houses, or fail to cover the intended house. This might result in acrimonious neighborhood complaints, altercation, or litigation. Disabling cellphone operations using (the signal amplitude of) an rf signal alone in fairly precise locations, such as in an auditorium, but not disabling these operations in nearby precise places such as the auditorium's lobby, would be difficult if not impossible.

However, if the cellphone has a processor coupled to a Global Positioning Satellite System (GPSS) receiver, the cellphone could determine its current geographical location within a few meters, and using an inventive GPSS technique discussed later, could improve accuracy of the cellphone's current geographical location to within a few decimeters. The cellphone's processor can then determine if the cellphone is in a zone, and if so, initiate, enable, disable or restore operations in the cellphone.

To further clarify this invention's background, now consider using a GPSS in the cellphone to determine if the cellphone is in a zone without using the courtesy signal system described in this application and its parent applications and patents. The zone's data could be stored in a separate module, such as a server, or else inside the cellphone.

If the zone information is stored only in some module outside the cellphone, then the cellphone has to transmit the cellphone's GPSS coordinates from itself towards the module where the zone information is stored. The coordinates could be transmitted out of the cellphone using the aforementioned cellphone to cellphone tower transmission, or some other similar transmitter. If the cellphone to cellphone tower transmission is disabled, the aforementioned other transmitter should be disabled too, for exactly the reasons were given earlier for disabling the cellphone to cellphone tower transmission. In the aforementioned catastrophic 9-11 situation, after ordinary user's cellphone transmission and/or the aforementioned other transmitters are disabled so only first responders can use their cellphones, the cellphone emerges from a zone in which transmission was prohibited to where it is permitted. To decide to enable the cellphone to cellphone tower transmitter, the cellphone needs to transmit the cellphone's GPSS coordinates to the aforementioned module to determine if the transmission is enabled, using the cellphone to cellphone tower or the aforementioned other transmitter. But at this time these cellphone to module transmissions, as well as the aforementioned other transmission if it is used, are disabled, so the aforementioned cellphone cannot transmit the required data to determine if the aforementioned transmissions will be enabled. This operation is impossible.

If the zone data is stored in a memory in the cellphone, the total size of this data is proportional to the number of zones. If the memory is 1-level (without some kind of a cache) this size can be large, eventually requiring current cellphones to be thrown away in favor of new cellphones having sufficient storage capacity for this data. Later expansion of the number of zones could result in needing to throw away these new cellphones in favor of newer cellphones having sufficient storage capacity for this even larger amount of data, and so on. Further, zone information can change with time. For instance in the aforementioned auditorium zone, preventing ringing during a performance, the zone should be created before the beginning of a performance, deactivated at the beginning of intermission, reactivated again at the end of the intermission, and destroyed at the end of the performance. The data needs to be current, or ringing may be improperly permitted, say, during the start of the second half of the performance, rather than just during the intermission.

Although storing zone data in a cellphone 1-level memory does not appear to be attractive, if the aforementioned data is brought into this aforementioned memory utilizing some kind of cache, and only the minimum useful data is sent into the cache, then storing zone data in the cellphone memory may be useful. Such a solution further needs a development of cache maintenance strategies and strategies to maintain consistency of multiple copies of the same data that are cached in multiple processors. This kind of system is not further developed because a courteous cellphone system, discussed shortly, appears to be significantly better than this kind of system that stores zone data in the cellphone memory.

SUMMARY OF THE INVENTION

A system is set forth, for initiating, enabling, disabling or restoring operations in a cellphone when the cellphone is in a geographic zone. The system's cellphone has a processor and a GPSS receiver, and the courtesy signal transmitter may have its own GPSS receiver. This courteous cellphone system stores data describing zones, in the courtesy signal transmitter, and transmits low-power rf courtesy signals that carries data describing zones to courteous cellphones, as discussed in this application's parent patents. The cellphone's GPSS location is checked against aforementioned zone data to see if the cellphone is in the zone. These courtesy signals are sent using a spread-spectrum signal carrier. This spread-spectrum signal can be initialized using GPSS data and a hardware counter in the courtesy signal transmitter, to prevent unauthorized transmitters from sending it. Finally this system can use the GPSS location of the courtesy signal transmitter to prevent the transmitter's unauthorized use in a different geographical area.

This inventive system stores only the necessary zone information in the courtesy signal transmitter which is information for zones near the location of the cellphone. The courtesy signals sent from the courtesy signal transmitter to the cellphone provide only the coordinates of zones that are nearby and need to be examined. Responsiveness, providing cellphones with timely and precise current GPSS location and zone data, does not significantly degrade as more cellphones, courtesy signal transmitters or zones are added to the system.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings in which:

DESCRIPTION OF A PREFERRED EMBODIMENT

Figure 1:
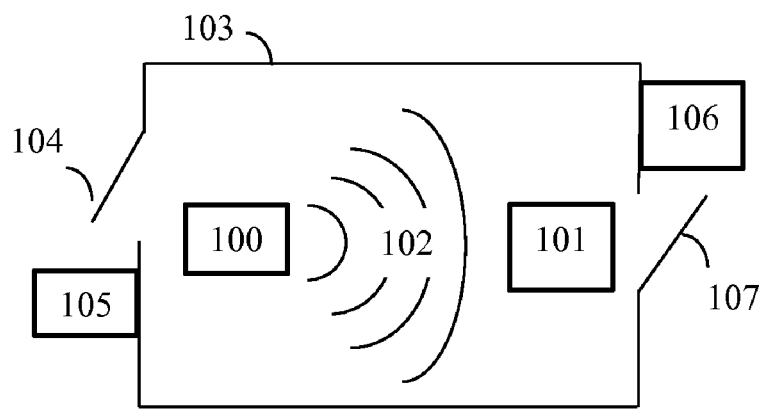
FIG. 1 is a diagram which shows the placement of transmitters relative to the cellphone, this figure being taken from FIG. 1 of the U.S. Pat. No. 6,675,002 parent patent.

FIG. 1 illustrates the general organization of this system. In a zone 103, an operation may be initiated, enabled, disabled, or restored by one of four operating modes or a combination thereof. In a first mode, the zone has one or more courtesy signal transmitters 100 transmitting courtesy signals 102 to one or more courtesy compliant cellphones 101 which may be carried by persons in the zone. The courtesy signal 102 passes throughout (blankets) the zone 103. In this application, each courtesy compliant cellphone has a GPSS receiver, and optionally, each transmitter also may have a GPSS receiver. Whenever a courtesy compliant cellphone 101 receives valid courtesy signal data 102 as determined by analyzing GPSS data, some operation is initiated, enabled, disabled or restored in that cellphone, responsive to the aforementioned courtesy signal data bits.

Alternatively in a second operating mode, a first courtesy signal transmitter 105 may be placed by each entrance 104 to zone 103, and a second courtesy signal transmitter 106 may be placed by each exit 107 from zone 103. When courtesy compliant cellphone 101 receives a courtesy signal from first courtesy signal transmitter 105, some operations will be enabled or disabled in the courtesy compliant cellphone until it exits through door 107 where it receives a courtesy signal from second courtesy signal transmitter 106, to restore the initial enabling or disabling conditions of the cellphone.

In a variation of this second mode, for instance in an airport jetway, a second courtesy signal is emitted near the airport terminus of the jetway, and the first courtesy signal is emitted near the airplane terminus of the jetway. As a courtesy compliant cellphone passes through the jetway from the airport into an airplane, the last-met courtesy signal disables the device before it enters the airplane, and as a courtesy compliant cellphone passes through the jetway out of an airplane, the last-met courtesy signal restores the device to its enabling or disabling state it had before it left the airport to board the airplane.

In a third operating mode, courtesy signal transmitters 105 and 106 may be placed by each entrances 104 and 107 to a zone 103. Upon receipt of a disabling courtesy signal from courtesy signal transmitter 105 or 107, a courtesy compliant cellphone 101 becomes disabled for a predetermined period of time, such as three hours.

In a fourth operating mode where doors can be either entrances to or else exits from an auditorium at different times, but not both entrances and exits at the same time, courtesy signal transmitters 105 and 106 may be placed by each door 104 and 107 of a zone 103. Before the performance, these aforementioned transmitters 105 or 106 are configured to save the state of enabling or disabling ringing, and then disable ringing, of courteous cellphones passing through either door 104 or 107. After the performance, courtesy signal transmitters 105 and 106 are reconfigured so that courteous cellphones passing through either door 104 or 107 restore the original state of enabling or disabling ringing.

Figure 2:
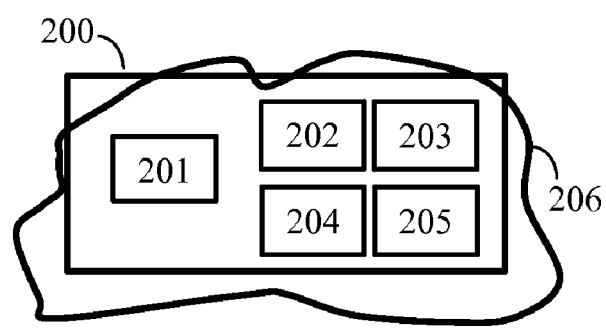
FIG. 2 is a floor plan of a four-room one-story schoolhouse in which is installed a courteous cellphone system having a single low-power rf courtesy signal transmitter.

Courtesy signal transmitters are to be disposed so that each zone's corners' coordinates are transmitted to each courteous cellphone without having two such signals transmitted simultaneously, so that one such courtesy signal will not mask out or interfere with a second courtesy signal. FIG. 2 shows the floor plan of a four classroom schoolhouse 200 comprised of four classrooms 202, 203, 204 and 205, each classroom being a zone, wherein a single courtesy signal transmitter 201 is disposed, say, in the principal's office. Zones are assumed to be rectangles in this discussion for simplicity, but in a realistic courteous cellphone system they will be some special case of three-dimensional convex polygons.

To set up the courtesy cellphone system during its installation, the coordinates of the courtesy signal transmitter and the coordinates of the corners of each classroom such as 202 are determined using a conventional GPSS receiver, and these coordinates are stored in a nonvolatile memory in the transmitter 201 in a predetermined order that associates each block of data storage to the GPSS coordinates of the courtesy signal transmitter and to the GPSS coordinates of corners of each classroom. For instance, if the courtesy signal transmitter is at location (5, 5) and if classroom 202 is a 10 meter by 20 meter room located at the origin, in which ringing is disabled, disabling indicated by the bit pattern 0010000, the transmitter location (5, 5) is sent first, following by the first zone's corners (0, 0), (0, 10), (20, 10) and (20, 0) and the bit pattern 0010000. This zone setup is repeated for each zone, 203, 204 and 205. These coordinates and other data bits are stored in courtesy signal transmitter 200's nonvolatile memory, and transmitted to all cellphones repetitively.

To configure the courteous cellphone system for daily operation, say each morning that school is in session, the timing and sequencing of initiating, enabling, disabling or restoring of operations for each zone are entered by a school employee, perhaps the principal's secretary-receptionist, and stored in the courtesy signal transmitter's memory. See FIG. 2. A very flexible daily schedule can be implemented. For instance, a first entry might be for classroom 202 giving the home room environment, probably permitting ringing in all courteous cellphones in the associated room. A second entry might be for classroom 202 giving the environment for the second school half-hour period which happens to be for an exam, disabling ringing, along with other operations, in all courteous cellphones in the associated room. A third entry might be for a fifteen minute recess, permitting cellphone ringing. Similarly, each additional period for classroom 202 would have data stored in consecutive locations in memory, implementing a room's schedule. Then the second classroom 203' schedule would be stored in memory, and so on up to classroom 205. Note that each schoolroom has its own schedule, and each schedule can be thus stored in the courtesy signal transmitter at the beginning of the school day. Also, obviously, each schedule can also be modified anytime during the day, and multiple schedules could be created in advance and stored to allow single-keystroke creation of an entire aforementioned schedule. While the above complex schedule is flexible, in some applications, only one zone could blanket the whole school, and remain without change throughout multiple days. This schedule could be predetermined and stored in the courtesy signal transmitter so no staff time would need to set it up each day.

Then on a repetitive basis, the time duration for repeating the courtesy signal transmission being designated the repetition period, the aforementioned period being sufficiently fast, say a repetition period of 1 second, the data in the transmitter's memory is read out and the courtesy signal bits are composed and sent out of the courtesy signal transmitter. The data for the first classroom 202 is transmitted. Then the data for the second classroom 203 is transmitted. Then the data for the third classroom 204 is transmitted. Then the data for the fourth classroom 205 is transmitted. Then the entire signal is transmitted again, starting with the data for classroom 202, and so on, repetitively.

If the courtesy signal transmitter further has a GPSS system, an inventive technique can be used to improve accuracy of the cellphone's location. The GPSS coordinates of the courtesy signal transmitter and the GPSS coordinates of the zone's corners' coordinates are stored in the transmitter's nonvolatile memory when the courtesy signal transmitter was set up. The current coordinates of the courtesy signal transmitter, minus the aforementioned stored coordinates of the courtesy signal transmitter, give a correction vector. This correction vector is added to each of the stored coordinates of each zone's corners as these coordinates are transmitted from the courtesy signal transmitter, in order to cancel out changes in the GPSS signal delay due to local weather and other external conditions that affect the GPSS signal delay. Further, the stored reference coordinate will be compared to the currently received reference coordinate, allowing for an offset of up to some distance, say 100 feet, to see if the transmitter is currently located close to where it was initially located, say within 100 feet. If the current reference coordinate differs more significantly from the stored coordinate by more than, say, 100 feet, an error courtesy signal could be transmitted instead of the normal courtesy signal so that any courteous cellphone can pick up this error signal and pass the information through the cellphone to the cellphone tower and the service provider.

To be reasonably confident that the courteous cellphones receive courtesy signals when the cellphone is in a zone, the radiation pattern of the courtesy signal transmitter is analyzed. To describe this analysis, a cover is defined to be a largest surface of a contiguous volume in which anywhere in the volume a courtesy signal is of sufficient power to be decoded in the courtesy signal receiver with reasonable probability (say 90%) of having no error. A comparatively low probability of 90% should be sufficient since the same courtesy signal data is repetitively sent, so if some received data is corrupted, it should be correctly received on the next transmission of the aforementioned data, say, within one second.

Courtesy signal transmitters should be disposed so that each such zones' coordinates are under the cover of at least one courtesy signal transmitter. Further, as many zones can be transmitted from a single courtesy signal transmitter as can be stored in the courtesy signal transmitter's memory, and transmitted within acceptable repetition time through the courtesy signal transmitter. If all the zones' data can be put in a single transmitter's memory, then transmission of zone data is inherently synchronized; no zone's data will be sent while a different zone's data is being sent because they are serially transmitted from the same courtesy signal transmitter.

Figure 3:
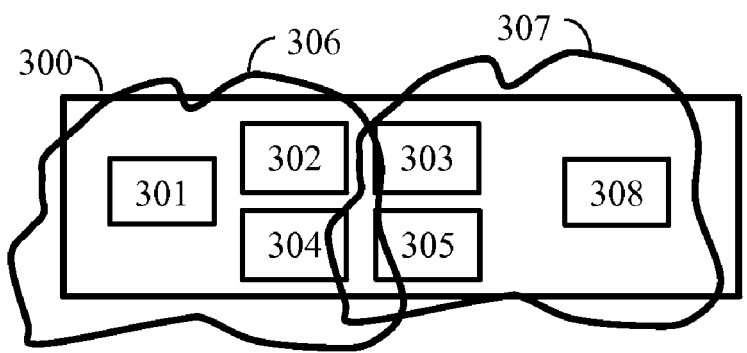
FIG. 3 is a floor plan of a four-room one-story schoolhouse in which is installed a courteous cellphone system having two low-power rf courtesy signal transmitters.

If the zone corner coordinates cannot all fit under a single transmitter's memory or its data be transmitted within the transmitter's repetition period, a second courtesy signal transmitter should be used so that all the aforementioned zone corner coordinates all fit under either transmitter's cover, and the zone's data fit into either corresponding transmitter's memory, and its data be sent within the transmitter's repetition rate. Suppose the aforementioned four room schoolhouse has two transmitters, each with its own cover. See FIG. 3. Transmitter 301's cover 306 covers classroom 302 and classroom 304, and transmitter 308's cover 307 covers classroom 303 and classroom 305. Transmitters 301 and 302 alternate sending their courtesy data. For instance, transmitter 301 sends courtesy signal data for classroom 302, and then the courtesy signal data for classroom 304. Then transmitter 308 sends courtesy signal data for classroom 303, and then the courtesy signal data for classroom 305. Transmitter 301 then sends courtesy signal data for classroom 302, and so on. A loop connection among n courtesy signal transmitters assigns them to a position along a loop so that after the $i^{th}$ transmitter has completely sent all its zone data, the $i+1^{st}$ transmitter begins to send all its zone data, and after it has completely sent its zone data, the $i+2^{nd}$ transmitter begins to send all its zone data, and so on, while $i<(n-1)$, and after the last transmitter has completely sent all its zone data, the first transmitter begins to send all its zone data, repetitively. If all the zones' data can be put in either transmitter's memory and the courtesy signal data is transmitted as just described, then no zone's data will be sent while a different zone's data is being sent because the two courtesy signal transmitters transmit alternatively.

This assignment of courtesy signal transmitters can be further generalized to permit non-overlapping zones be assigned the same time slots, as was discussed by U.S. Pat. No. 6,675,002. However, the explanation of details of this assignment introduces terms and assignment procedures that do not appear to clarify much of the inventiveness of this application. So this detailed discussion, which should be understood by a person of ordinary skill in the art, is omitted.

A cellphone which does not have a GPSS receiver can utilize a courtesy signal from a courtesy signal transmitter that has GPSS data encoded into it. The aforementioned cellphone simply ignores the GPSS data. The courtesy signal transmitter applies the courtesy signal initiating, enabling and disabling bits to all cellphones that receive a (sufficiently high signal amplitude) signal and should be sufficient if the cellphone is under any cover of a transmitter transmitting data with the courtesy signal initiating, enabling and disabling bits. So the cellphone receives these aforementioned bits over a larger area. For instance, a rectangular-shaped church surrounded by parking lots might have a single courtesy signal transmitter disposed in an office in it, transmitting a courtesy signal whose zone is the aforementioned rectangle (church). GPSS-based cellphones would enable or disable operations only in the church, while cellphones not equipped with the aforementioned GPSS would disable cellphones in the church and part of its surrounding parking lots. If this system does not have acceptable performance, ultrasonic courtesy signal transmitters, rather than low-power rf courtesy signals, can be used nearby where initiating, enabling, disabling or restoring operations are carried out.

If a courteous cellphone system might have cellphones that have GPSS receivers as well as cellphones that do not have GPSS receivers, then the courtesy signal transmitters should be disposed as needed by the latter kind of system. GPSS transmitters transmitting courtesy signals to initiate, enable, disable or restore devices at entrances to or exit from a zone should be located near the aforementioned entrances and exits. GPSS transmitters transmitting courtesy signals to initiate, enable, disable or restore devices throughout a zone should be located near the zone. The cellphone incorporating a GPSS receiver need only receive courtesy signals from each courtesy signal transmitter which is under the aforementioned transmitter's cover.

It is possible to alter the data communicated from the GPSS receiver to the processor, or to alter the program in that processor. Widespread use of such an apparatus or method would render this system useless. So to prevent this from happening, as discussed in parent application Ser. No. 12/785,449, the inventor claims these measures as his intellectual property, with the intent of prosecuting for patent infringement any company that tries to manufacture, distribute or sell the apparatuses or methods that alter GPSS receiver data.

Courtesy signals are encoded in the courtesy signal transmitter by a form of spread-spectrum communications as discussed in U.S. Pat. No. 4,559,633. In the signal transmitter, the transmitted signal is obtained by exclusive-ORing the input courtesy signal serial data with a serial reference binary signal, bit-by-bit. This serial reference binary signal is generated by a pseudorandom number generator whose sequence of numbers is a function of the generator's initial seed number. This courtesy signal is sent to the courtesy signal receiver where it is decoded by exclusive-ORing the transmitted data with the same serial reference binary signal, bit-by-bit, to obtain decoded courtesy signal data. This serial reference binary signal's seed can be computed, at least in part, in the courtesy signal transmitter, from the stored GPSS position data of the transmitter, and the current time, which can be just the number in a free-running counter in the courtesy transmitter. The courtesy signal transmitter uses this seed to generate the serial reference binary signal, which will be used to encode the courtesy signal. The aforementioned seed can be sent unencoded to the courtesy cellphone, which uses it as the seed to compute the serial reference binary signal, which can be used to decode the courtesy signal data. Since both the encoder and decoder use the same seed, the data output from the courtesy signal receiver's decoder should match the data input to the courtesy signal transmitter's encoder.

The aforementioned encoding method has an additional advantage for courteous systems utilizing ultrasonic signals. It sounds good to cellphone users. Where ultrasonic data is sent without exclusive-ORing it with a serial reference binary signal, audible sub harmonic signals are generated which sound somewhat like annoying sine wave audio signals.

Where (pseudorandom) ultrasonic data is exclusive-ORed with the aforementioned serial reference binary signal, signals are generated which sound like pleasing white noise "shhhh" audio signals. How appropriate. This sounds like a person requesting a cellphone user to be quiet. The courtesy signal emitted from the courtesy signal transmitter actually requests non-courteous cellphone users to look at the courtesy signal transmitter. A small LCD display on the courtesy signal transmitter can indicate which operations are to be initiated, enabled, disabled or restored. Responsive to this sound, if the user does not have a courteous cellphone, the user can manually implement what courteous cellphones do automatically.

A courteous cellphone receiver is either a microphone, for ultrasonic signals or an antenna, for low-power radio signals, or both.

If courtesy signals are low-power radio signals, a Faraday shield (also called a Faraday cage) might be a copper wire mesh wrapped around a room in order to hinder transmission of rf signals through it. Some years ago, there was a news report of an attempt to use a Faraday shield to block rf signals to or from the cellphone tower. In a courteous cellphone system using low-power rf signals, courtesy signal transmissions might be disabled by wrapping an aforementioned Faraday shield around the cellular phone, in order to interfere with aforementioned courtesy signals while not disabling frequency signals to or from the cellphone tower. Such a system is claimed in this application to prevent large-scale commercial implementation of it, which would render the courteous cellphone system useless.

In this application, there is considerable difference between a system blocking cellphone tower communication using a Faraday shield, and a system blocking courtesy signals using a Faraday shield. The former has difficulty permitting emergency calls to get through the aforementioned Faraday shield, while the later has to be tuned so that the cellphone tower rf signal is permitted to pass through the shield while rf courtesy signals are blocked by the aforementioned shield.

Figure 4:
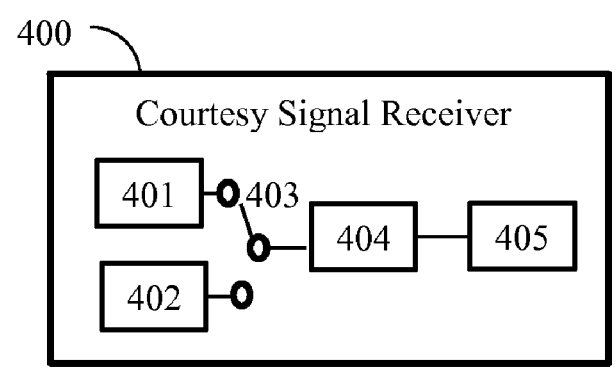
FIG. 4 shows a block diagram of the courtesy signal receiver system receiving either low-power rf or ultrasonic courtesy signals.

A single courteous cellphone can handle both ultrasonic and low-power rf signals. FIG. 4 illustrates a block diagram of a courtesy signal receiver able to accept and decode courtesy signals of either type. Courtesy signal receiver 400 is comprised of ultrasonic courtesy signal receiver 401 and of low-power rf courtesy signal receiver 402. A switch 403 selects one of them at a time to provide data through I/O device 404 to processor 405, according to earlier discussion of synchronization techniques of this inventive courteous cellphone system. I/O device 404 and processor 405 can be designed to use the same code and data for either ultrasonic or low-power rf courtesy signal decoding. With respect to communication systems concepts, receivers 401 and 402 handle the different physical levels while I/O device 404 and processor 405 handle the common link level, and processor 405 handles common I/O device operations and operations on data in it. So the ultrasonic courtesy signal receiver 401 and low-power rf courtesy signal receiver 402 only have different "front end" parts. Ultrasonic courtesy signal receiver 401 is coupled to the microphone, audio amplifier and decoder. Low-power rf courtesy signal receiver 402 is coupled to a radio antenna, a radio-frequency amplifier and an rf detector. The ultrasonic and low-power rf receivers and components coupled to them should not require more than, say 100 transistors. So if an ultrasonic courtesy signal cellphone is implemented, adding an rf courtesy signal receiver would not increase the cost significantly, and vice versa.

Modifications to this invention can be made by one skilled in the art without departing from the spirit of the invention. While the invention has been described in connection with illustrative embodiments, obvious variations therein will be apparent to those skilled in the art without the exercise of invention. Accordingly the invention should be limited only to the scope of the appended claims.

I claim:

1. A system that initiates, enables, disables, or restores cellphone operations when said cellphone is in a zone, comprising:
   (a) a zone, which is a contiguous geographical area where courteous cellphones may be operable, such as an auditorium,
   (b) data describing said zone, comprising bits to initiate, enable, disable or restore cellphone operations in said zone,
   (c) said zone being coextensive with a three-dimensional concave polygon, said polygon having a plurality of corners, said corner having GPSS coordinates,
   (d) a courtesy signal transmitter transmitting courtesy signals to courtesy signal receivers in said courteous cellphones that are within said transmitter's cover, a transmitter's cover being a largest surface of a contiguous volume in which anywhere in the volume said courtesy signal transmitted from said courtesy signal transmitter is of sufficient power to be received and decoded, with acceptable probability, in a courtesy signal receiver disposed in said courteous cellphone,
   (e) placing courtesy signal transmitters such that all of said polygon's interior be under the cover of at least one courtesy signal transmitter, but such that no two said courtesy signal transmitter signals interfering with each other,
   (f) a cellphone comprising components:
   (i) a transceiver that communicates with a cellphone tower to communicate voice and data signals to or from other cellphones, said transceiver not communicating any said data describing said zones, corners or bits,
   (ii) a microphone that inputs audio signals,
   (iii) a speaker that outputs audio signals,
   (iv) a keyboard wherein telephone numbers can be dialed and data can be entered,
   (v) a display where at least said telephone number being dialed can be displayed,
   (vi) a ringer that outputs a ring tone, and
   (vii) (optionally) a camera where a picture or a video can be taken,
   (g) a GPSS system disposed within and coupled to said cellphone that outputs coordinates of said cellphone's current location,
   (h) a cellphone memory, disposed within said cellphone and storing, at least in part, said polygon's corner's coordinates and said of polygon's bits, said stored data not including said cellphone users' personal data, nor data being provided in response to said cellphone user having an accident, and said stored data not being any part of a message's zone address,
   (j) a processor that initializes said memory with data describing said zones, polygons, polygon's corners and bits in the zone, and then repeatedly executes forever a single loop program,
   (k) a single pass of said single loop program that repeatedly reads each said zone's data, read one zone at a time from said memory, to compare it to the cellphone location obtained from said GPS system, wherein, if said cellphone is in said zone, said processor, responsive to said zones' data bits, initiates, enables, disables or restores operations in said cellphone's components.

2. A system as described in claim 1, in which said cellphone's GPSS coordinates, said zone's coordinates, or zone's bits are replaced by incorrect data to defeat said system, potentially rendering it useless.

3. A system as described in claim 1, wherein said cellphone's memory storing said zone's data is stored in a cache's or cache-like's random access memory, disposed within said cellphone and coupled to said processor.

4. A system as described in claim 1, wherein said data describing said zone is encoded, transmitted, received and decoded as a simplex (unidirectional) courtesy signal channel, said system additionally comprising:
   (a) a courtesy signal transmitter disposed to store, encode and transmit said courtesy signal, said courtesy signal being comprised of said data describing said zone,
   (b) a courtesy signal receiver disposed within said courteous cellphone and coupled to said memory, to receive, decode and store said courtesy signals,
   wherein said courtesy signal is transmitted from said courtesy signal transmitter to courtesy signal receivers disposed in courteous cellphones under said cover, said signal being decoded in said processor to determine if said cellphone is in said zone, and if so, said processor, responsive to said zone' data bits, initiates, enables, disables or restores operations in said cellphone's said components.

5. A system as defined in claim 4 in which said courtesy signal data is replaced by incorrect data to defeat said system, potentially rendering it useless.

6. A system as defined in claim 4 wherein said courtesy signal is an ultrasonic serial binary signal.

7. A system as defined in claim 4 wherein said courtesy signal is a low-power rf serial binary signal.

8. A system as defined by claim 4 in which said courtesy signal is encoded in said courtesy signal transmitter by exclusive-ORing the input courtesy signal serial data with a serial reference binary signal, bit-by-bit, to encode the data, in which said ultrasonic courtesy signal is later decoded in said courtesy compliant cellphone by exclusive-ORing said transmitted data with said serial reference binary signal, bit-by-bit, to obtain decoded courtesy signal data.

9. A system as defined in claim 8 in which said serial reference binary signal is initialized, at least in part, from GPSS position data.

10. A system as defined in claim 8 in which said serial reference binary signal is initialized, at least in part, from a free-running timer.

11. A system as defined in claim 4 in which said courtesy signal transmitter also has a GPSS system disposed in it, and in which said initial courtesy signal transmitter coordinates and zone's coordinates, obtained when said system was first set up, are stored in said courtesy signal transmitter's non-volatile memory.

12. A system as defined in claim 11 wherein a correction vector is added to stored zone corner coordinates just before said coordinates are transmitted from said courtesy signal transmitter, wherein said correction vector is the current coordinates of the courtesy signal transmitter minus the aforementioned stored coordinates of the courtesy signal transmitter, which was obtained when the system was set up.

13. A system as described by claim 11 in which said courtesy signal transmitter's current GPSS coordinates are compared to said stored courtesy signal transmitter's GPSS location to determine if the transmitter is at the location where it was when it was first set up, as it should have been, or else is operating at some unauthorized location.

14. A system as described by claim 13 in which said stored GPSS coordinates or current GPSS coordinates are replaced by incorrect data to defeat said system, potentially rendering it useless.

15. A method for initiating, enabling, disabling or restoring operations within a cellphone system when said cellphone is in a zone; comprising the steps of:
   (a) specifying zones, each of which is a geographic area, such as an auditorium, wherein cellphone operations need to be initiated, enabled, disabled or restored together,
   (b) deriving bits needed to execute said initiating, enabling, disabling or restoring in cellphones within said zone,
   (c) for each said zone, selecting one or more geometric three-dimensional concave polygons that are collectively coextensive with said zone, each said polygon having a plurality of corners,
   (d) deriving GPSS coordinates of all said corners,
   (e) placing courtesy signal transmitters such that each of said polygon's corner's coordinates be under the cover of at least one courtesy signal transmitter, but such that no two said courtesy signal transmitter signals interfering with each other, said transmitter's cover being a largest surface of a contiguous volume in which anywhere in the volume a courtesy signal transmitted from said courtesy signal transmitter is of sufficient power to probably be correctly received and decoded in a courtesy signal receiver disposed in said cellphone,
   (f) storing, in said courtesy signal transmitter's memory, data describing each said zone under its cover, each data comprising GPSS coordinates describing the position of said zone's polygon's corners, and bits to initiate, enable, disable or restore cellphone operations in said zone,
   (g) a cellphone user using a cellphone, comprising steps of (in any order):
   (i) communicating with a cellphone tower using a transceiver,
   (ii) receiving audio signals through a microphone,
   (iii) outputting audio signals through a speaker,
   (iv) dialing telephone numbers and entering data using a keyboard,
   (v) displaying data such as said telephone number,
   (vi) producing a ring tone with a ringer, or
   (vi) (optionally) taking a picture or video with a camera,
   (h) receiving said cellphone's current location coordinates from a GPSS receiver incorporated in said cellphone,
   (j) receiving courtesy signal data from said courtesy signal transmitter's memory through courtesy signal receiver disposed in said cellphone,
   (k) writing said received courtesy signal data in a cellphone's memory, said memory not storing said cellphone users' personal data nor data responsive to an emergency wherein said cellphone user has an accident,
   (m) determining if said current cellphone location obtained from said GPSS receiver output is in said zone whose data is stored in said cellphone's memory and,
   (n) if said cellphone is in said zone, initiating, enabling, disabling or restoring said said cellphone operations, responsive to said zone's bits to initiate, enable, disable, or restore cellphone operations of said cellphone user using a cellphone.

16. A method as described in claim 15, in which said zone data is received from a random access memory disposed within the cellphone, coupled to said processor and managed like a cache.

17. A method as described in claim 15, in which said zone data is received from said courtesy signal receiver and stored in cellphone's memory.

18. A method, as described in claim 15, which, after obtaining said GPSS coordinates of said GPSS receiver, said method replaces said GPSS data with incorrect data to defeat said method, potentially rendering it useless.

19. A method as defined in claim 17 wherein said courtesy signal is an ultrasonic serial binary signal.

20. A method as defined in claim 17 wherein said courtesy signal is a low-power rf serial binary signal.

* * * * *